2,970,894

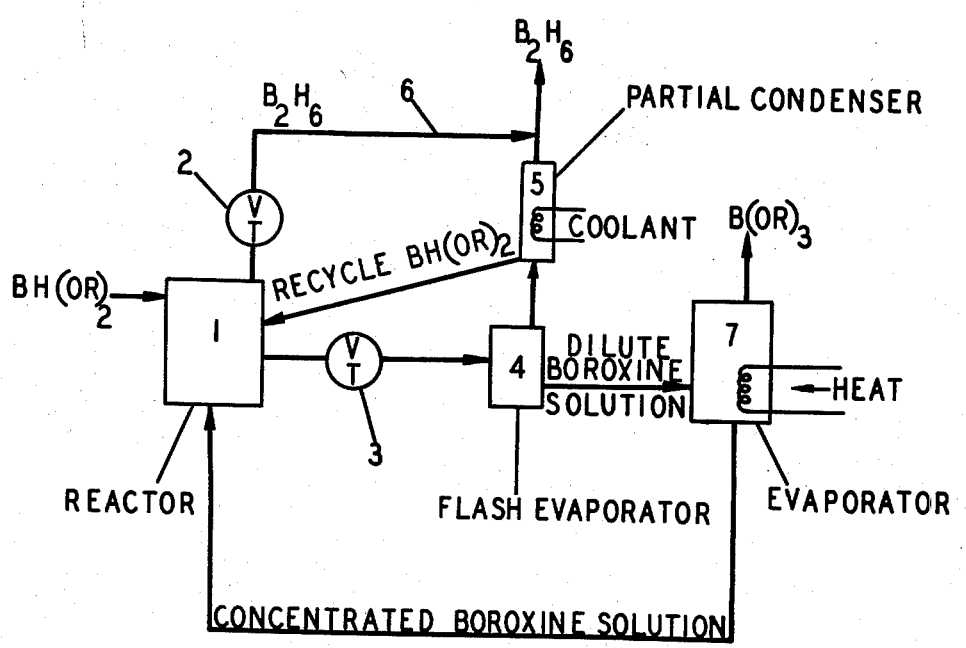
PREPARATION OF DIBORANE FROM DIALKOXYBORANES
Cecil C. Chappelow, Jr.
Roland L. Hughes
INVENTORS
BY Neal J. Mosely
their Attorney United States Patent Office 2,970,894
Patented Feb. 7, 1961

PREPARATION OF DIBORANE

Cecil C. Chappelow, Jr., and Roland L. Hughes, Kansas City, Mo., assignors to Callery Chemical Company, Pittsburgh, Pa., a corporation of Pennsylvania Filed Apr. 5, 1956, Ser. No. 576,470

4 Claims. (Cl. 23—204)

This invention relates to an improved method for the preparation of diborane and more particularly to its preparation by the disproportionation of a dialkoxyborane $[BH(OR)_2]$ in the presence of a boroxine $[B_3O_3(OR)_3]$ solution.

Diborane ($B_2H_6$) has become very important in recent years as an intermediate in the preparation of high energy fuels and other boron containing compounds. Recently it has been proposed that diborane could be produced using dialkoxyboranes such as dimethoxyborane $[HB(OCH_3)_2]$ as an intermediate which would disproportionate into diborane and the corresponding trialkyl borate. In Bush, Serial No. 498,735, filed April 1, 1955, and McElroy et al., Serial No. 498,737, filed April 1, 1955, there are described processes for preparing dialkoxyboranes by the reaction of an alkali metal hydride or borohydride with a trialkyl borate or a mixture of a trialkyl borate and a trialkoxy boroxine. The processes described in these co-pending applications resulted in the production of dialkoxyboranes such as dimethoxyborane in high yield. It has been found, however, that dialkoxyboranes such as dimethoxyborane are much more stable than had been previously reported. In the prior literature (e.g. The Chemistry of the Hydrides by D. T. Hurd) dimethoxyborane (sometimes referred to as dimethoxyborine) is described as being a very unstable compound which disproportionates to diborane and methyl borate very rapidly at room temperature. The instability of dimethoxyborane is indicated as being so great that its boiling point can be determined only by extrapolation of the vapor pressure data. Recent experimental work, however, has shown that at 40% C. gaseous dimethoxyborane disproportionates only about 3 to 6% in 200 minutes. Similarly, at 80° C. gaseous dimethoxyborane disproportionates only about 20% in 200 minutes. The disproportionation proceeds at a somewhat faster rate in the liquid phase. The rate of disproportionation is also increased with an increase in temperature when sufficient pressure is applied to keep the dimethoxyborane in the liquid phase, as is disclosed in the copending application of Schechter and Huff, Serial No. 510,527, filed May 23, 1955, now abandoned. The rate at which the disproportionation proceeds is relatively slow unless high temperatures (to about 80° C.) and corresponding high pressure are used. At 32% C. only about 16% of a sample of dimethoxyborane was disproportioned after 30 minutes.

It is therefore an object of this invention to provide an improved method for preparing diborane by the disproportionation of dialkoxyboranes.

It is a further object to provide a method of rapidly disproportionating dialkoxyboranes at moderate temperatures and pressures to obtain diborane and a trialkylborate.

Another object is to provide a process to prepare diborane from the disproportionation of liquid dialkoxyboranes in the presence of trialkoxyboroxine solutions.

It is a more specific object to provide a process to prepare diborane from the disproportionation of dimethoxyborane at moderate conditions of temperature and pressure in the presence of a methoxyboroxine solution.

Other objects will become apparent throughout the specification and claims as hereinafter related.

The attached drawing is a schematic flow sheet of a process of preparing diborane and regenerating a concentrated boroxine solution.

This invention consists of a method of effecting an increased rate of disproportionation of dialkoxyborane to diborane and a trialkylborate which comprises contacting the dialkoxyborane with an alkoxyboroxine solution.

This invention is based on the discovery that the rate at which a dialkoxyborane disproportionates into diborane and the trialkyl borate is markedly increased when the liquid dialkoxyborane is in contact with a solution of an alkoxyboroxine. An increase in the rate of disproportionation of liquid dimethoxyborane occurs when any amount of the alkoxyboroxine is present. It is effective when using small catalytic amounts of alkoxyboroxine as well as when using a large excess of alkoxyboroxine. The rate at which diborane is produced is higher in any mixture of dialkoxyborane and alkoxyboroxine at any temperature than with dialkoxyborane alone at a corresponding temperature.

The term alkoxyboroxines throughout this application refers to any liquid whose composition can be precisely expressed in terms of $B_2O_3$ and trialkylborate content. These compositions may be considered as a solution of boric oxide in the trialkyl borate in which the amount of boric oxide in solution may be varied. It is our belief, however, that the true picture is one of a continuously varying mixture of condensation products, having many different molecular weights, the exact nature depending upon the ratio of the components $B_2O_3$ and $B(OR)_3$. Any particular solution can be defined in that it contains only boron, oxygen and certain alkoxy groups and has a certain boron content. For example, methyl borate contains 9.62 milliatoms of boron per gram. Any solution containing only boron, oxygen and methoxy groups and containing more than 9.62 milliatoms of boron per gram is a boroxine solution. In the case of methoxyboroxines it is preferred to use a solution containing less than 20 milliatoms of boron per gram, as solutions containing higher amounts of boron are extremely viscous. The composition which is commonly referred to as trimethoxyboroxine has a boron content of 17.2 milliatoms of boron per gram.

Dimethoxyborane disproportionates according to the equation $6BH(OCH_3)_2 = B_2H_6 + 4B(OCH_3)_3$. The methoxyboroxine solutions can be expressed as a composition of $B_2O_3$ and $B(OCH_3)_3$. For convenience the composition of liquid mixtures of dimethoxyborane and methoxyboroxine solutions are expressed as concentrations of boric oxide, methyl borate and dimethoxyborane.

In a series of experiments the following described apparatus and experimental procedure was used. A 250 millititer 3-necked flask was fitted with a mercury sealed stirrer, a dropping funnel, and an insulated cold finger reflux condenser. The top of the condenser discharged into a spiral acid scrubber and from the scrubber into a wet-test meter. Dimethoxyborane was introduced into the flask and kept at a temperature of about −25° C. Methoxyboroxine solution to be added from the dropping funnel was prewarmed to a temperature such that the reacting mixture of dimethoxyborane and methoxyboroxine would have a temperature of 20° C. The prewarmed trimethoxyboroxine was admitted to the flask under a nitrogen pressure. Disproportionation started immediately. Any vaporized dimethoxyborane or methyl borate was returned to the reaction flask as reflux from the cold finger condenser which was cooled with dry ice in alcohol. The diborane produced passed to the acid scrubber and reacted to form hydrogen, 6 mols of hydrogen for each mol of diborane. The amount of hydrogen was measured to determine the amount of diborane produced. The results of a series of runs at atmospheric pressure are set forth in Table I.

*Table I*

| Starting Composition | | | Temp., °C. | Percent of Dimethoxyborane Disproportionated in 20 minutes |
|---|---|---|---|---|
| mol DMB* | mol $B_2O_3$ | mol MB** | | |
| 0.279 | 0.000 | 0.302 | 20 | 2.0 |
| 0.551 | 0.097 | 0.500 | 20 | 16.5 |
| 0.500 | 0.132 | 0.148 | 20 | 39.6 |
| 0.449 | 0.263 | 0.311 | 20 | 37.0 |
| 0.507 | 0.488 | 0.557 | 30 | 44.5 |

*Dimethoxyborane.
**Methyl borate.

The presence of only a small amount of $B_2O_3$ (as boroxine solution) increases the rate of diborane formation very significantly. An increase of the $B_2O_3$ content of the reaction mixtures increases the rate of diborane formation. Increase in temperature also increases the rate of diborane formation. Boroxine solutions of any concentration can be used, although it is preferred to use solutions with a relatively high boric oxide content.

A metal apparatus was constructed to permit the investigation of the reaction at superatmospheric pressure. The apparatus was essentially the same as that used in the atmospheric pressure experiments. The reactor was constructed of brass and was equipped with a magnetic stirrer, thermometer and a heater. The reactor was connected to a reflux condenser through a high-pressure sight glass. A back pressure on the reactor and condenser system was controlled by a Cartesian manostat. Diborane produced was discharged from the manostat through a wet test meter (filled with kerosene rather than water) which measured the diborane produced. Dimethoxyborane was very rapidly disproportionated at slightly elevated temperature and pressure in the presence of boroxine solutions. The results of a series of runs are set forth in Table II.

*Table II*

| Starting Composition | | | Temp., °C. | Pressure, p.s.i.g. | Percent $BH(OCH_3)_2$ disproportionated after— | | |
|---|---|---|---|---|---|---|---|
| mol $B_2O_3$ | mol $B(OCH_3)_3$ | mol $BH(OCH_3)_2$ | | | 1 min. | 3 min. | 6 min. |
| 0 | 0 | .51 | 40-42 | 47-50 | 3.3 | 7.5 | 14.0 |
| .25 | .25 | .54 | 42 | 37 | 40.5 | ---- | 49.0 |
| .50 | .50 | .54 | 42-46 | 37 | 63.0 | 73.5 | 100 |
| .50 | .50 | .26 | 38-42 | 38 | 100 | ---- | ---- |
| .50 | .50 | .54 | 75-77 | 50 | 90.5 | 100 at 2½ min. | |

The by-product of the disproportionation of dimethoxyborane is methyl borate which is also a component of the boroxine solution. Thus the boroxine solution obtained from a disproportionation reaction is more dilute, or degraded, than the original solution. For example, when a mixture of 1 mol of dimethoxyborane is disproportionated in a boroxine solution containing 1 mol of $B_2O_3$ and 1 mol of methyl borate, 0.67 mol of methyl borate is produced by the disproportionation reaction. The resulting boroxine solution then contains 1.67 mols of methyl borate for each mol of $B_2O_3$. It is preferred to use a boroxine solution of such a concentration and in such amounts that the final boroxine solution contains not more than 2 mols of methyl borate for each mol of $B_2O_3$.

The more dilute or degraded boroxine solutions can easily be concentrated or upgraded by a simple evaporation step. The trialkyl borate is the only volatile product obtained when an alkoxyboroxine solution is heated or boiled. The upgrading evaporation can be incorporated as a regeneration cycle in a process to prepare diborane in which there is no consumption of boroxine.

This process is schematically illustrated in the attached figure. Dimethoxyborane and boroxine solutions are brought together in the reactor 1 at superatmospheric pressure. The dimethoxyborane can be fed as a liquid, or fed as a gas and condensed or absorbed in the reactor. The pressure is reduced across valve 2 and diborane is removed at atmospheric pressure. The pressure is also reduced across valve 3 and the liquid products are sent to an atmospheric pressure flash evaporator 4. In this flash evaporator any dissolved diborane and undisproportionated dimethoxyborane are vaporized. The dimethoxyborane is condensed by the partial condenser 5 and returned to the reactor 1. Diborane passes this partial condenser and is joined with the major product stream 6 from the reactor 1. The liquid product from the flash evaporator 4, a dilute boroxine solution is passed to the evaporator 7. Methyl borate is removed from the solution in this evaporator and the liquid bottoms product is then concentrated boroxine solution. This concentrated boroxine solution is returned to the reactor 1 and reused. Dimethoxyborane is the only material charged to the process and diborane and methyl borate are the only products of the process. The process can be operated continuously or batchwise as a succession of operations.

Other alkoxyboroxines may be used equally as well as methoxyboroxine to increase the rate at which dimethoxyborane disproportionates. Other dialkoxyboranes such as diethoxyborane also disproportionate very rapidly in the presence of alkoxyboroxine solutions. The process illustrated with methoxy substituted boranes and boroxines, is equally operative with other dialkoxyboranes and alkoxyboroxines.

While we have described our process as required by law and have illustrated several preferred embodiments of this process it is to be understood that within the scope of the appended claims this invention may be practiced otherwise than as specifically described.

What we desire to claim and secure by Letters Patent of the United States is:

1. A process for preparing diborane which comprises disproportionating a di-lower-alkoxyborane in the presence of an lower-alkoxyboroxine, recovering the diborane formed, and evaporating tri-loweralkyl borate from the by-product diluted boroxine solution, recovering the tri-loweralkyl borate, and recycling the concentrated boroxine solution for the disproportionation of additional dialkoxyborane.

2. A process according to claim 1 in which the dialkoxyborane is dimethoxyborane and the alkoxyboroxine is a methoxyboroxine.

3. A process according to claim 2 in which the concentrated boroxine solution is of such a composition that the dilute boroxine solution has a composition equivalent to a solution containing not more than 2 mols of methyl borate for each mol of $B_2O_3$.

4. A method according to claim 3 in which the disproportionation reaction is carried out at a temperature between 40 and 80° C. and a pressure between 35 to 50 pounds per square inch.

References Cited in the file of this patent
UNITED STATES PATENTS 2,494,968 Schlesinger et al. ........ Jan. 17, 1950

OTHER REFERENCES

Hurd: "Chemistry of the Hydrides," page 91, John Wiley & Sons (1952). (Copy in Scientific Library.)